(12) United States Patent
Hilbrandie et al.

(10) Patent No.: US 9,297,664 B2
(45) Date of Patent: Mar. 29, 2016

(54) METHOD OF PROCESSING POSITIONING DATA

(75) Inventors: Geert Hilbrandie, Amsterdam (NL); Karine Hilbrandie, legal representative, Amsterdam (NL); Ralf-Peter Schäfer, Berlin (DE); Peter Mieth, Berlin (DE); Ian Malcom Atkinson, Edinburgh (GB); Martin Wolf, Veenedaal (NL); Ben Rutten, Delft (NL)

(73) Assignee: TomTom International B.V., Amsterdam (NL)

( * ) Notice: Subject to any disclaimer, the term of this patent is extended or adjusted under 35 U.S.C. 154(b) by 831 days.

(21) Appl. No.: 12/734,260

(22) PCT Filed: Oct. 22, 2008

(86) PCT No.: PCT/EP2008/064320

§ 371 (c)(1),
(2), (4) Date: Jun. 9, 2010

(87) PCT Pub. No.: WO2009/053408

PCT Pub. Date: Apr. 30, 2009

(65) Prior Publication Data

US 2010/0250127 A1  Sep. 30, 2010

Related U.S. Application Data

(60) Provisional application No. 60/996,050, filed on Oct. 26, 2007, provisional application No. 60/996,052, filed on Oct. 26, 2007.

(51) Int. Cl.
*G01C 21/00* (2006.01)
*G01C 21/34* (2006.01)
(Continued)

(52) U.S. Cl.
CPC .......... *G01C 21/3492* (2013.01); *G01C 21/32* (2013.01); *G08G 1/0104* (2013.01);
(Continued)

(58) Field of Classification Search
CPC ................. G08G 1/096844; G08G 1/096827; G08G 1/096888; G08G 1/0104
USPC ................ 701/117–119, 400, 408–415, 423, 701/532–534, 23–26
See application file for complete search history.

(56) References Cited

U.S. PATENT DOCUMENTS

| 5,913,917 A | 6/1999 | Murphy |
|---|---|---|
| 6,012,013 A | 1/2000 | McBurney |

(Continued)

FOREIGN PATENT DOCUMENTS

| DE | 10037827 A1 | 2/2002 |
|---|---|---|
| DE | 102006010572 A1 | 9/2007 |

(Continued)

OTHER PUBLICATIONS

International Search Report.
(Continued)

*Primary Examiner* — John Q Nguyen
*Assistant Examiner* — Anshul Sood

(57) ABSTRACT

A method is disclosed, for processing positioning data to generate map data which includes a plurality of navigable segments representing segments of a navigable route in the area covered by the map, with each segment being arranged to have speed data associated therewith. In at least one embodiment, the method includes classifying the speed data associated with at least some, and generally each, navigable segment having speed data associated therewith into a category of a classification having a plurality of categories into which the speed data can be classified according to a parameter of a navigable segment with which the speed data is associated; generating a category average for each category within the classification; assessing at least some, and generally each, navigable segment within the map data to determine whether there is speed data associated therewith; and if there is no speed data associated with a navigable segment, using the category average, according to the parameter of the navigable segment being processed, as the speed data for the navigable segment being processed.

14 Claims, 10 Drawing Sheets

(51) Int. Cl.
*G01C 21/32* (2006.01)
*G08G 1/01* (2006.01)
*G08G 1/0968* (2006.01)
*G08G 1/052* (2006.01)

(52) U.S. Cl.
CPC .............. *G08G1/0129* (2013.01); *G08G 1/052* (2013.01); *G08G 1/096827* (2013.01); *G08G 1/096844* (2013.01); *G08G 1/096888* (2013.01)

(56) References Cited

U.S. PATENT DOCUMENTS

| | | | |
|---|---|---|---|
| 6,122,593 A * | 9/2000 | Friederich et al. | 701/532 |
| 6,178,374 B1 | 1/2001 | Mohlenkamp et al. | |
| 6,181,020 B1 | 1/2001 | Uchida et al. | |
| 6,188,943 B1 | 2/2001 | Uchida et al. | |
| 6,317,686 B1 | 11/2001 | Ran | |
| 6,401,027 B1 * | 6/2002 | Xu et al. | 701/117 |
| 6,567,744 B1 | 5/2003 | Katayama et al. | |
| 6,587,777 B1 | 7/2003 | St. Pierre | |
| 6,621,452 B2 | 9/2003 | Knockeart et al. | |
| 6,707,421 B1 | 3/2004 | Drury et al. | |
| 6,812,888 B2 | 11/2004 | Drury et al. | |
| 6,909,398 B2 * | 6/2005 | Knockeart et al. | 342/357.31 |
| 6,990,401 B2 | 1/2006 | Neiss et al. | |
| 7,050,903 B1 | 5/2006 | Shutter et al. | |
| 7,079,946 B2 * | 7/2006 | Hunzinger | 701/532 |
| 7,375,649 B2 | 5/2008 | Gueziec | |
| 7,516,041 B2 * | 4/2009 | Smartt et al. | 702/167 |
| 7,630,986 B1 | 12/2009 | Herz et al. | |
| 7,706,964 B2 | 4/2010 | Horvitz et al. | |
| 7,774,121 B2 | 8/2010 | Lee et al. | |
| 7,957,893 B2 * | 6/2011 | Smartt | 701/450 |
| 8,063,755 B2 | 11/2011 | Eikelenberg et al. | |
| 8,332,132 B2 | 12/2012 | Groenhuijzen et al. | |
| 2001/0029425 A1 | 10/2001 | Myr | |
| 2004/0030670 A1 | 2/2004 | Barton | |
| 2004/0034467 A1 | 2/2004 | Sampedro et al. | |
| 2004/0104842 A1 | 6/2004 | Drury et al. | |
| 2004/0225437 A1 * | 11/2004 | Endo et al. | 701/209 |
| 2004/0230373 A1 | 11/2004 | Tzamaloukas | |
| 2005/0027434 A1 | 2/2005 | Hirose | |
| 2005/0093720 A1 | 5/2005 | Yamane et al. | 340/995.13 |
| 2005/0206534 A1 | 9/2005 | Yamane | |
| 2005/0222751 A1 | 10/2005 | Uyeki | |
| 2006/0074551 A1 * | 4/2006 | Zaitsu et al. | 701/209 |
| 2006/0089787 A1 * | 4/2006 | Burr et al. | 701/202 |
| 2006/0106531 A1 | 5/2006 | Nagase et al. | |
| 2006/0178807 A1 | 8/2006 | Kato et al. | |
| 2006/0206256 A1 | 9/2006 | Kumagai et al. | |
| 2007/0106465 A1 | 5/2007 | Adam et al. | |
| 2007/0208496 A1 | 9/2007 | Downs et al. | |
| 2007/0208501 A1 | 9/2007 | Downs et al. | |
| 2008/0004789 A1 | 1/2008 | Horvitz et al. | |
| 2008/0071466 A1 * | 3/2008 | Downs et al. | 701/117 |
| 2008/0234921 A1 * | 9/2008 | Groenhuijzen et al. | 701/118 |
| 2008/0312811 A1 * | 12/2008 | Yamane | 701/118 |
| 2009/0287405 A1 * | 11/2009 | Liu et al. | 701/119 |
| 2010/0253541 A1 | 10/2010 | Seder et al. | |
| 2010/0253542 A1 | 10/2010 | Seder et al. | |
| 2011/0055210 A1 | 3/2011 | Meredith et al. | |

FOREIGN PATENT DOCUMENTS

| | | |
|---|---|---|
| EP | 1005627 B1 | 10/2003 |
| EP | 1503355 A1 | 2/2005 |
| EP | 1657692 A | 5/2006 |
| EP | 1840519 A2 | 10/2007 |
| FR | 2900728 A1 | 11/2007 |
| GB | 2 431 261 | 4/2007 |
| JP | 07-129893 | 5/1995 |
| JP | 2005017151 A | 1/2005 |
| JP | 2005038447 A | 2/2005 |
| JP | 2006184084 A | 7/2006 |
| WO | 9909374 A1 | 2/1999 |
| WO | 0201532 A1 | 1/2002 |
| WO | 2007042796 A1 | 4/2007 |

OTHER PUBLICATIONS

International Search Report issued Feb. 18, 2009 for International Application No. PCT/EP2008/064317.
International Search Report issued Feb. 4, 2009 for International Application No. PCT/EP2008/064318.
International Search Report issued Feb. 11, 2009 for International Application No. PCT/EP2008/064319.
International Search Report issued Feb. 4, 2009 for International Application No. PCT/EP2008/064322.
International Search Report issued Mar. 23, 2009 for International Application No. PCT/EP2008/064323.
Bekir, Bailin, A Clustering Based Methodology for Determining the Optical Roadway Configuration of Detectors for Travel Time Estimation, Transportation Research Board 2007 Annual Meeting, Submitted to the 86th Transportation Research Board Annual Meeting, Aug. 1, 2006, found online at www.rits.rutgers.edu/files/clusteringpaper.pdf, see pp. 1-13.
Standard Deviation Definition, 2pages, May 8, 2005 available online @ http://web.archive.org/web/20050208112010/http://www.chemicool.com/definition/standard_deviation.html, last accessed Jun. 5, 2012.
A Tutorial on Clustering Algorithms, 3pages, dated Aug. 11, 2007 via wayback machine, available online @ http://web.archive.org/web/20070811043338/http://home.dei.polimi.it/matteucc/Clustering/tutorial_html/, last accessed Jun. 5, 2012.

* cited by examiner

METHOD OF PROCESSING POSITIONING DATA

This application is a National Phase entry of PCT Application number PCT/EP2008/064320 filed on Oct. 22, 2008, which claims priority under 35 U.S.C. §119(e), 120 and 365 (c) to U.S. Provisional Application Nos. 60/996,050 filed on Oct. 26, 2007 and 60/996,052, filed on Oct. 26, 2007.

FIELD OF THE INVENTION

The invention relates to a method of processing positioning data and in particular to processing positioning data in order to generate map data arranged to be used in navigation devices and in particular, but not especially in a Portable Navigation Device (PND). The invention also provides related apparatus for providing the method.

BACKGROUND OF THE INVENTION

Map data for electronic navigation devices, such as GPS based personal navigation devices like the GO™ from TomTom International BV, comes from specialist map vendors such as Tele Atlas NV. Such devices are also referred to as Portable Navigation Devices (PND's). This map data is specially designed to be used by route guidance algorithms, typically using location data from the GPS system. For example, roads can be described as lines—i.e. vectors (e.g. start point, end point, direction for a road, with an entire road being made up of many hundreds of such segments, each uniquely defined by start point/end point direction parameters). A map is then a set of such road vectors, data associated with each vector (speed limit; travel direction, etc.) plus points of interest (POIs), plus road names, plus other geographic features like park boundaries, river boundaries, etc., all of which are defined in terms of vectors. All map features (e.g. road vectors, POIs etc.) are typically defined in a co-ordinate system that corresponds with or relates to the GPS co-ordinate system, enabling a device's position as determined through a GPS system to be located onto the relevant road shown in a map and for an optimal route to be planned to a destination.

To construct this map database, Tele Atlas starts with basic road information from various sources, such as the Ordnance Survey for roads in England. It also has a large, dedicated team of vehicles driving on roads, plus personnel checking other maps and aerial photographs, to update and check its data. This data constitutes the core of the Tele Atlas map database. This map database is being continuously enhanced with geo-referenced data. It is then checked and published four times a year to device manufacturers like TomTom.

Each such road segment has associated therewith a speed data for that road segment which gives an indication of the speed at which a vehicle can travel along that segment and is an average speed generated by the party that produced the map data, which may be, for example, Tele Atlas. The speed data is used by route planning algorithms on PND's on which the map is processed. The accuracy of such route planning thus depends on the accuracy of the speed data. For example, a user is often presented with an option on his/her PND to have it generate the fastest route between the current location of the device and a destination. The route calculated by the PND may well not be the fastest route if the speed data is inaccurate.

It is known that parameters such as density of traffic can significantly effect the speed profile of a segment of road and such speed profile variations mean that the quickest route between two points may not remain the same. Inaccuracies in the speed parameter of a road segment can also lead to inaccurate Estimated Times of Arrival (ETA) as well as selection of a sub-optimal quickest route.

Tele Atlas have developed a system in which GPS data is uploaded from PND's and used to provide speed parameters for segments of the map data which aims to provide speed parameters which show the true speed on a road segment at predetermined times of a day.

SUMMARY OF THE INVENTION

According to a first aspect of the invention there is provided a method of processing positioning data to generate map data which comprises a plurality of navigable segments representing segments of a navigable route in the area covered by the map with each segment being arranged to have speed data associated therewith, the method comprising:

i. classifying the speed data associated with at least some, and generally each, navigable segment having speed data associated therewith into a category of a classification having a plurality of categories into which the speed data can be classified according to a parameter of a navigable segment with which the speed data is associated;

ii. generating a category average for each category within the classification;

iii. assessing at least some, and generally each, navigable segment within the map data to determine whether there is speed data associated therewith; and iv. if there is no speed data associated with a navigable segment, using the category average, according to the parameter of the navigable segment being processed, as the speed data for the navigable segment being processed.

Such a method is advantageous because it helps to ensure that each navigable segment in the area covered by the map data has speed data associated therewith which is may be a better indication of the traffic flow along that road segment than other data such as the speed limit for that road segment. It will be appreciated that the average speed may in fact be the same, or at least close, to the speed limit for that road segment. Such an improved estimate of speed for any given road segment may well increase the accuracy of routing algorithms to determine a journey across the area represented by the map data.

The navigable segments generally represent segments of a road but may also represent segments of any other path, channel or the like navigable by a vehicle, person or the like. For example, a navigable segment may represent a segment of a path, river, canal, cycle path, tow path, rail way line, or the like. Thus, it will be appreciated that reference to traffic is not necessarily limited to vehicles moving along a road segment but may relate to any movement along a navigable segment.

For example, traffic may refer to bikes moving along a cycle path.

The method may comprise an initial step of capturing GPS data. Such capture of GPS data may be by way of uploading GPS data from at least one, and generally a plurality, of Portable Navigation Devices (PND's). In such a method the uploaded GPS data from the PND's may be stored for processing in the steps of the method. The skilled person will appreciate that basing data on a plurality of devices is likely to result in speed data that more closely relates to actual conditions on the navigable segment.

Conveniently, the GPS data is processed in order to generate the speed data associated with one or more navigable segments. Such a method is believed advantageous since it allows the speed data to reflect the recorded speeds on a navigable segment rather than assuming that the speed at which traffic flows along a segment is a speed limit associated with that segment. As such, PND's, or other devices, using the map data should be able to produce more accurate route planning.

Processing of the speed data may aim to generate a measured speed profile for each navigable segment within the map data.

In some embodiments, the processing may aim to generate a daily measured speed profile for each navigable segment (ie a speed profile which is specific to a day of the week). Daily may be thought of as a first time period.

In other embodiments, the processing may aim to generate a measured speed profile covering other time periods; ie second time periods which may be longer time periods than the first time period. For example, in some embodiments, the processing may aim to generate a weekday measured speed profile and/or a weekend measured speed profile. Other embodiments may use a single measured speed profile for a weekly period. The skilled person will appreciate that using smaller time periods (eg daily) of coverage for a speed profile may make the speed profile more representative of actual traffic flow. However, it will also be appreciated that as time period of coverage decreases the amount of data required to generate those measured speed profiles also increases.

The method may analyse speed data associated with a navigable segment to determine the quality of that speed data. If the quality of the speed data falls bellow a predetermined threshold then the method may replace that speed data with the category average.

The predetermined threshold may be determined by any of the following; the absolute number of readings that went to make up the speed data, the standard deviation of the speed data, or any other suitable measure.

In other embodiments, if speed data comprises a measured speed profile and the quality of that measured speed profile falls below a predetermined threshold the method may be arranged to replace that measured speed profile, for that navigable segment, with a measured speed profile covering a longer time period. For example, the speed data may comprise a measured speed profile covering a period of a day and should the method determine that the daily measured speed profile is not of sufficiently high quality then it may be replaced with a speed profile covering a weekly period. Such a method is believed advantageous since there is likely to be data from a higher number of PND's or other such devices to make up the measured speed profile for the longer period resulting in a perhaps a more accurate profile.

Generally, in step i of the method, the average speeds are classified according to a predetermined classification. Such a method is perhaps convenient as it is likely to reduce the processing power required since it is not then necessary to generate a classification as the processing proceeds.

The classification may be arranged such that roads of a similar nature are grouped together within a category. Such a method is convenient since this is likely to provide a more accurate category average and as such allow devices such as PND's to provide better routing.

The method may comprise a further step of performing cluster analysis on the measured speed profiles in order to generate a set of cluster generated speed profiles.

The method may further comprise the step of mapping the speed data associated with at least some and generally each navigable segment to a cluster generated speed profile.

Conveniently, the speed data associated with at least some, and generally each, navigable segment may be replaced with a reference to the cluster generated segment. Such a step may reduce, perhaps significantly, the amount of data required to store the speed data within the map data.

In some embodiments, the cluster generated speed profiles are normalised according to a parameter. Such a method may allow the cluster generated speed profile to be mapped to more measured speed profiles.

The parameter used to normalise the cluster generated speed profile may be any of the following: the speed limit of the navigable segment to which the speed profile relates; the free flow speed of traffic along the navigable segment; the average speed along the navigable segment; any other suitable parameter.

The method may comprise storing, for that navigable segment, the parameter used to normalise the cluster generated speed profile in the map data. Such a method should allow the cluster generated speed profile to be re-generated from the parameter and the reference to the cluster generated speed profile thereby further reducing the data required to store the speed data for that road segment.

Conveniently, the method comprises a final step in which a map is generated from the map data.

According to a second aspect of the invention there is provided a machine readable data carrier containing instructions, which when read by a machine cause that machine to perform the method of the first aspect of the invention.

According to a third aspect of the invention there is provided a machine arranged to process map data comprising a plurality of navigable segments representing segments of a navigable route in the area covered by the map with each segment being arranged to have speed data associated therewith, the machine being arranged to:

classify the speed data of at least some, and generally each, navigable segment having speed data associated therewith into a category of a classification having a plurality of categories into which the speed data can be classified according to a parameter of a navigable segment with which the speed data is associated;

generate a category average for each category within the classification;

assess at least some, and generally each, navigable segment within the map data to determine whether there is speed data associated therewith; and if there is no speed data associated with a navigable segment, to associate the category average, according to the parameter of the navigable segment being processed, as the speed date for the navigable segment being processed.

According to a fourth aspect of the invention there is provided a machine readable medium containing instructions which when read by a machine cause that machine to perform as the machine of the third aspect of the invention.

According to a fifth aspect of the invention there is provided map data comprising a plurality of navigable segments representing segments of a navigable route in the area covered by the map data, each navigable segment has speed data associated therewith wherein each of the navigable segments is classified into a category of a classification and at least one of the navigable segments has speed data associated therewith which comprises an average of the speed data of other navigable segments with the same category of the classification.

According to a sixth aspect of the invention there is provided a machine readable medium containing the map data of the third aspect of the invention.

In any of the above aspects of the invention the machine readable medium may comprise any of the following: a floppy disk, a CD ROM, a DVD ROM/RAM (including a −R/−RW and +R/+RW), a hard drive, a memory (including a USB memory key, an SD card, a Memorystick™, a compact flash card, or the like), a tape, any other form of magneto optical storage, a transmitted signal (including an Internet download, an FTP transfer, etc), a wire, or any other suitable medium.

BRIEF DESCRIPTION OF THE DRAWINGS

At least one embodiment of the invention will now be described, by way of example only, with reference to the accompanying drawings, in which.

DETAILED DESCRIPTION OF EMBODIMENT OF THE INVENTION

Figure 1:
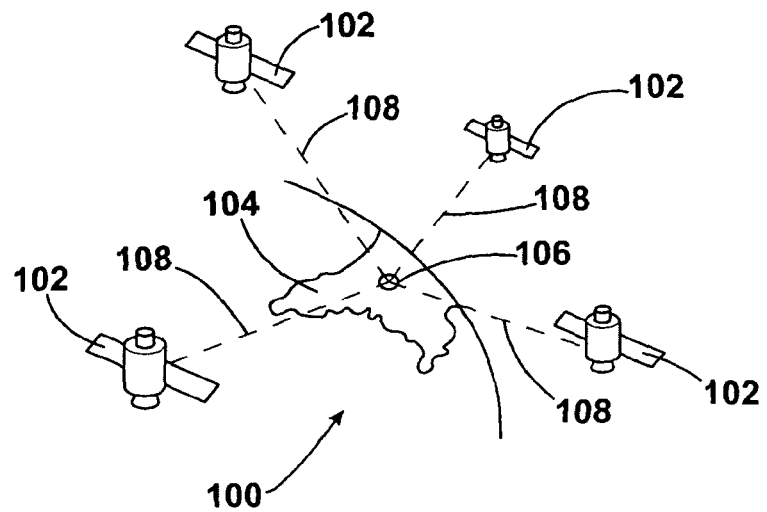
FIG. 1 is a schematic illustration of an exemplary part of a Global Positioning System (GPS) usable by a navigation device.

Throughout the following description identical reference numerals will be used to identify like parts.

Embodiments of the present invention will now be described with particular reference to a Portable Navigation Device (PND). It should be remembered, however, that the teachings of the present invention are not limited to PNDs but are instead universally applicable to any type of processing device that is configured to execute navigation software in a portable manner so as to provide route planning and navigation functionality. It follows therefore that in the context of the present application, a navigation device is intended to include (without limitation) any type of route planning and navigation device, irrespective of whether that device is embodied as a PND, a vehicle such as an automobile, or indeed a portable computing resource, for example a portable personal computer (PC), a mobile telephone or a Personal Digital Assistant (PDA) executing route planning and navigation software.

Further, embodiments of the present invention are described with reference to road segments. It should be realised that the invention may also be applicable to other navigable segments, such as segments of a path, river, canal, cycle path, tow path, rail way line, or the like. For ease of reference these are commonly referred to as a road segment.

It will also be apparent from the following that the teachings of the present invention even have utility in circumstances, where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location, as GPS data, to any number of receiving units. However, it will be understood that Global Positioning systems could be used, such as GLOSNASS, the European Galileo positioning system, COMPASS positioning system or IRNSS (Indian Regional Navigational Satellite System).

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives GPS data as spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
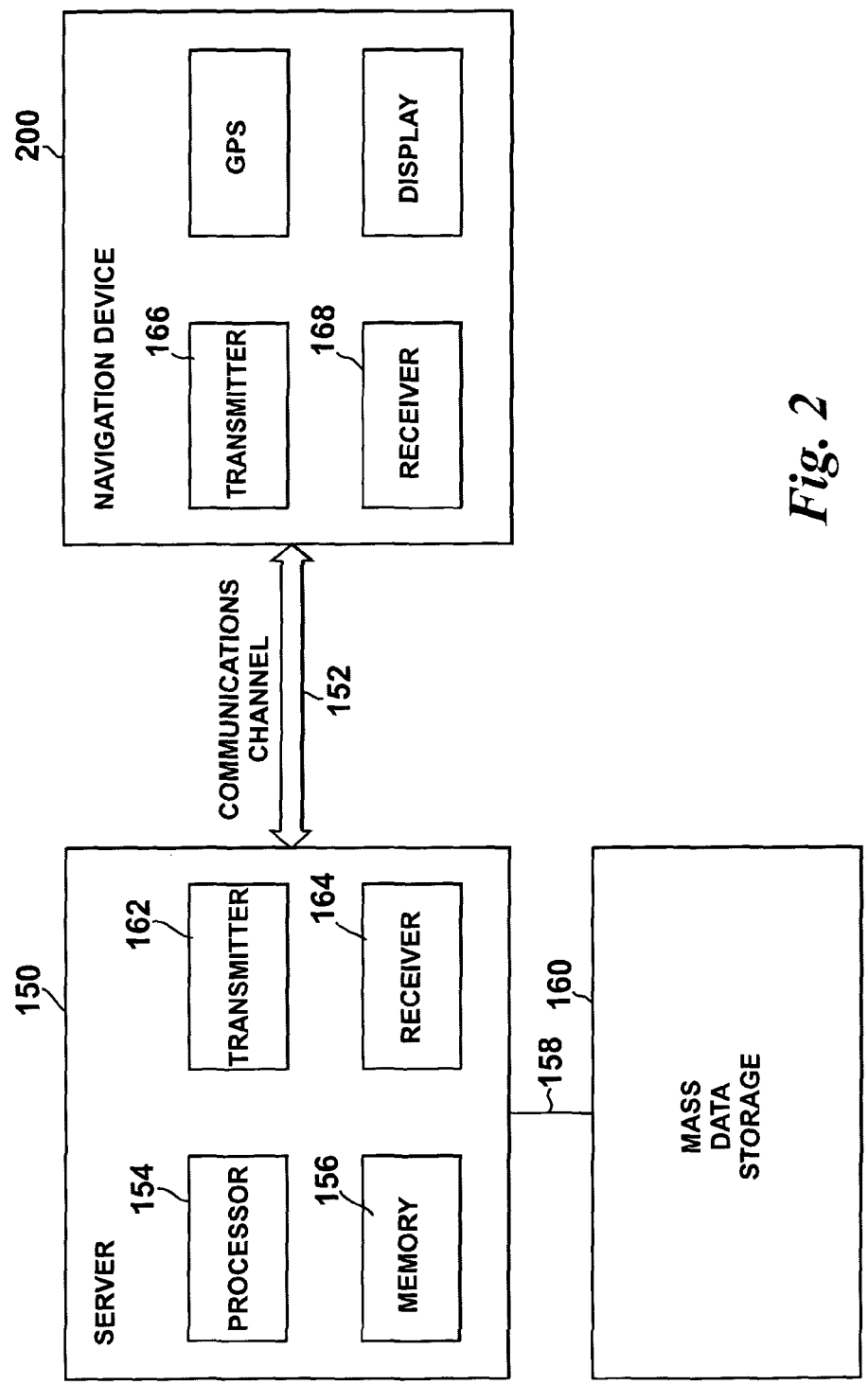
FIG. 2 is a schematic diagram of a communications system for communication between a navigation device and a server.

Turning to FIG. 2, a navigation device 200 (ie a PND) comprising or coupled to the GPS receiver device 106, is capable of establishing a data session, if required, with network hardware of a "mobile" or telecommunications network via a mobile device (not shown), for example a mobile telephone, PDA, and/or any device with mobile telephone technology, in order to establish a digital connection, for example a digital connection via known Bluetooth technology. Thereafter, through its network service provider, the mobile device can establish a network connection (through the Internet for example) with a server 150. As such, a "mobile" network connection can be established between the navigation device 200 (which can be, and often times is, mobile as it travels alone and/or in a vehicle) and the server 150 to provide a "real-time" or at least very "up to date" gateway for information.

The establishing of the network connection between the mobile device (via a service provider) and another device such as the server 150, using the Internet for example, can be done in a known manner. In this respect, any number of appropriate data communications protocols can be employed, for example the TCP/IP layered protocol. Furthermore, the mobile device can utilize any number of communication standards such as CDMA2000, GSM, IEEE 802.11a/b/c/g/n, etc.

Hence, it can be seen that the Internet connection may be utilised, which can be achieved via data connection, via a mobile phone or mobile phone technology within the navigation device 200 for example.

Although not shown, the navigation device 200 may, of course, include its own mobile telephone technology within the navigation device 200 itself (including an antenna for example, or optionally using the internal antenna of the navigation device 200). The mobile phone technology within the navigation device 200 can include internal components, and/or can include an insertable card (e.g. Subscriber Identity Module (SIM) card), complete with necessary mobile phone technology and/or an antenna for example. As such, mobile phone technology within the navigation device 200 can similarly establish a network connection between the navigation device 200 and the server 150, via the Internet for example, in a manner similar to that of any mobile device.

For telephone settings, a Bluetooth enabled navigation device may be used to work correctly with the ever changing spectrum of mobile phone models, manufacturers, etc., model/manufacturer specific settings may be stored on the navigation device 200 for example. The data stored for this information can be updated.

In FIG. 2, the navigation device 200 is depicted as being in communication with the server 150 via a generic communications channel 152 that can be implemented by any of a number of different arrangements. The communication channel 152 generically represents the propagating medium or path that connects the navigation device 200 and the server 150. The server 150 and the navigation device 200 can communicate when a connection via the communications channel 152 is established between the server 150 and the navigation device 200 (noting that such a connection can be a data connection via mobile device, a direct connection via personal computer via the Internet, etc.).

The communication channel 152 is not limited to a particular communication technology. Additionally, the communication channel 152 is not limited to a single communication technology; that is, the channel 152 may include several communication links that use a variety of technology. For example, the communication channel 152 can be adapted to provide a path for electrical, optical, and/or electromagnetic communications, etc. As such, the communication channel 152 includes, but is not limited to, one or a combination of the following: electric circuits, electrical conductors such as wires and coaxial cables, fibre optic cables, converters, radio-frequency (RF) waves, the atmosphere, free space, etc. Furthermore, the communication channel 152 can include intermediate devices such as routers, repeaters, buffers, transmitters, and receivers, for example.

In one illustrative arrangement, the communication channel 152 includes telephone and computer networks. Furthermore, the communication channel 152 may be capable of accommodating wireless communication, for example, infrared communications, radio frequency communications, such as microwave frequency communications, etc. Additionally, the communication channel 152 can accommodate satellite communication.

The communication signals transmitted through the communication channel 152 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), General Packet Radio Service (GPRS), etc. Both digital and analogue signals can be transmitted through the communication channel 152. These signals may be modulated, encrypted and/or compressed signals as may be desirable for the communication technology.

The server 150 includes, in addition to other components which may not be illustrated, a processor 154 operatively connected to a memory 156 and further operatively connected, via a wired or wireless connection 158, to a mass data storage device 160. The mass storage device 160 contains a store of navigation data and map information, and can again be a separate device from the server 150 or can be incorporated into the server 150. The processor 154 is further operatively connected to transmitter 162 and receiver 164, to transmit and receive information to and from navigation device 200 via communications channel 152. The signals sent and received may include data, communication, and/or other propagated signals. The transmitter 162 and receiver 164 may be selected or designed according to the communications requirement and communication technology used in the communication design for the navigation system 200. Further, it should be noted that the functions of transmitter 162 and receiver 164 may be combined into a single transceiver.

As mentioned above, the navigation device 200 can be arranged to communicate with the server 150 through communications channel 152, using transmitter 166 and receiver 168 to send and receive signals and/or data through the communications channel 152, noting that these devices can further be used to communicate with devices other than server 150. Further, the transmitter 166 and receiver 168 are selected or designed according to communication requirements and communication technology used in the communication design for the navigation device 200 and the functions of the transmitter 166 and receiver 168 may be combined into a single transceiver as described above in relation to FIG. 2. Of course, the navigation device 200 comprises other hardware and/or functional parts, which will be described later herein in further detail.

Software stored in server memory 156 provides instructions for the processor 154 and allows the server 150 to provide services to the navigation device 200. One service provided by the server 150 involves processing requests from the navigation device 200 and transmitting navigation data from the mass data storage 160 to the navigation device 200. Another service that can be provided by the server 150 includes processing the navigation data using various algorithms for a desired application and sending the results of these calculations to the navigation device 200.

The server 150 constitutes a remote source of data accessible by the navigation device 200 via a wireless channel. The server 150 may include a network server located on a local area network (LAN), wide area network (WAN), virtual private network (VPN), etc.

The server 150 may include a personal computer such as a desktop or laptop computer, and the communication channel 152 may be a cable connected between the personal computer and the navigation device 200. Alternatively, a personal computer may be connected between the navigation device 200 and the server 150 to establish an Internet connection between the server 150 and the navigation device 200.

The navigation device 200 may be provided with information from the server 150 via information downloads which may be updated automatically, from time to time, or upon a user connecting the navigation device 200 to the server 150 and/or may be more dynamic upon a more constant or frequent connection being made between the server 150 and navigation device 200 via a wireless mobile connection device and TCP/IP connection for example. For many dynamic calculations, the processor 154 in the server 150 may be used to handle the bulk of processing needs, however, a processor (not shown in FIG. 2) of the navigation device 200 can also handle much processing and calculation, oftentimes independent of a connection to a server 150.

Figure 3:
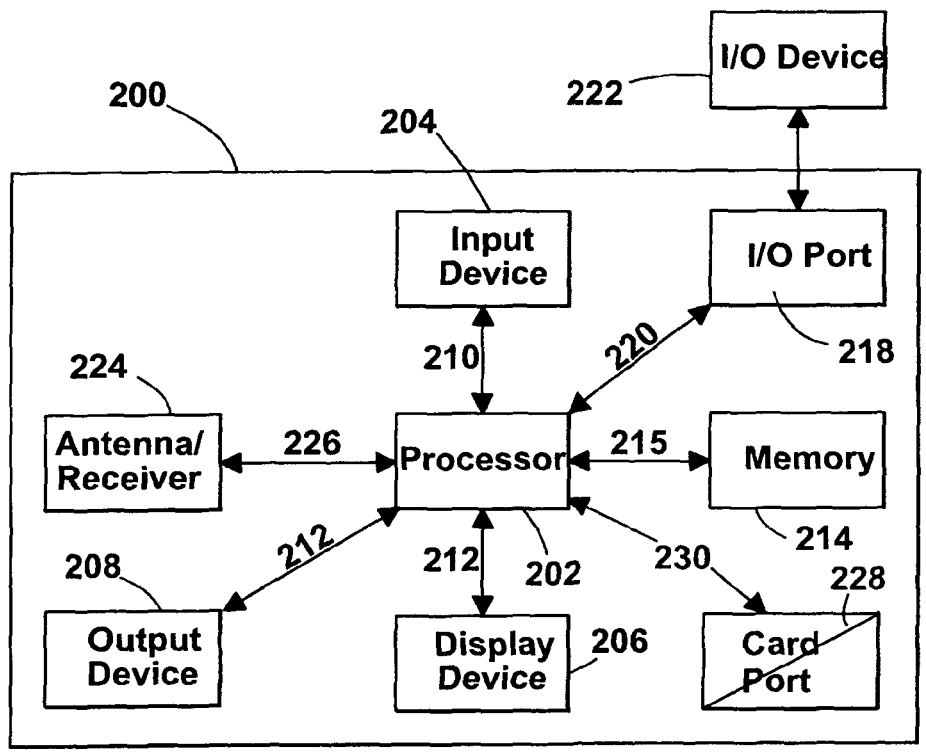
FIG. 3 is a schematic illustration of electronic components of the navigation device of FIG. 2 or any other suitable navigation device.

Referring to FIG. 3, it should be noted that the block diagram of the navigation device 200 is not inclusive of all components of the navigation device, but is only representative of many example components. The navigation device 200 is located within a housing (not shown). The navigation device 200 includes processing circuitry comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, one aspect of the input device 204, the touch panel, and the display screen 206 are integrated so as to provide an integrated input and display device, including a touchpad or touchscreen input 250 (FIG. 4) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214 via connection 216 and is further adapted to receive/send information from/to input/output (I/O) ports 218 via connection 220, wherein the I/O port 218 is connectible to an I/O device 222 external to the navigation device 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the Internet or any other network for example, and/or to establish a connection to a server via the Internet or some other network for example.

The memory 214 of the navigation device 200 comprises a portion of non-volatile memory (for example to store program code) and a portion of volatile memory (for example to store data as the program code is executed). The navigation device also comprises a port 228, which communicates with the processor 202 via connection 230, to allow a removable memory card (commonly referred to as a card) to be added to the device 200. In the embodiment being described the port is arranged to allow an SD (Secure Digital) card to be added. In other embodiments, the port may allow other formats of memory to be connected (such as Compact Flash (CF) cards, Memory Sticks™, xD memory cards, USB (Universal Serial Bus) Flash drives, MMC (MultiMedia) cards, SmartMedia cards, Microdrives, or the like).

FIG. 3 further illustrates an operative connection between the processor 202 and an antenna/receiver 224 via connection 226, wherein the antenna/receiver 224 can be a GPS antenna/receiver for example and as such would function as the GPS receiver 106 of FIG. 1. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 3 are powered by one or more power sources (not shown) in a conventional manner. Such power sources may include an internal battery and/or a input for a low voltage DC supply or any other suitable arrangement. As will be understood by one of ordinary skill in the art, different configurations of the components shown in FIG. 3 are contemplated. For example, the components shown in FIG. 3 may be in communication with one another via wired and/or wireless connections and the like. Thus, the navigation device 200 described herein can be a portable or handheld navigation device 200.

In addition, the portable or handheld navigation device 200 of FIG. 3 can be connected or "docked" in a known manner to a vehicle such as a bicycle, a motorbike, a car or a boat for example. Such a navigation device 200 is then removable from the docked location for portable or handheld navigation use. Indeed, in other embodiments, the device 200 may be arranged to be handheld to allow for navigation of a user.

Figure 4:
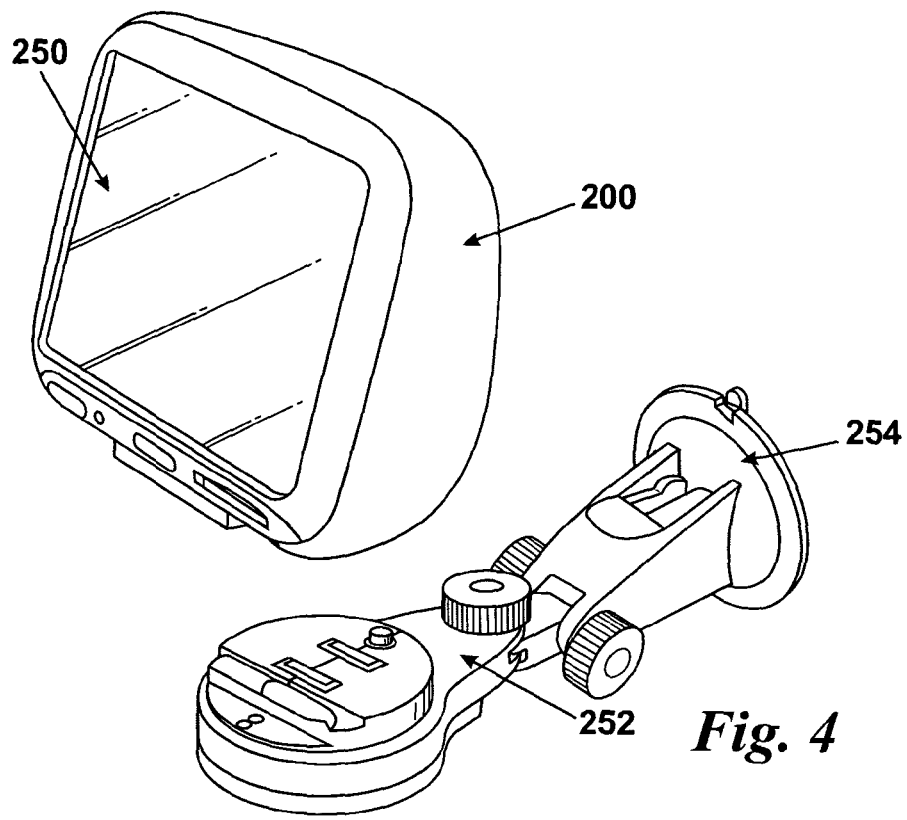
FIG. 4 is a schematic diagram of an arrangement of mounting and/or docking a navigation device.

Referring to FIG. 4, the navigation device 200 may be a unit that includes the integrated input and display device 206 and the other components of FIG. 2 (including, but not limited to, the internal GPS receiver 224, the processor 202, a power supply (not shown), memory systems 214, etc.).

The navigation device 200 may sit on an arm 252, which itself may be secured to a vehicle dashboard/window/etc.

using a suction cup 254. This arm 252 is one example of a docking station to which the navigation device 200 can be docked. The navigation device 200 can be docked or otherwise connected to the arm 252 of the docking station by snap connecting the navigation device 200 to the arm 252 for example. The navigation device 200 may then be rotatable on the arm 252. To release the connection between the navigation device 200 and the docking station, a button (not shown) on the navigation device 200 may be pressed, for example. Other equally suitable arrangements for coupling and decoupling the navigation device 200 to a docking station are well known to persons of ordinary skill in the art.

Figure 5:
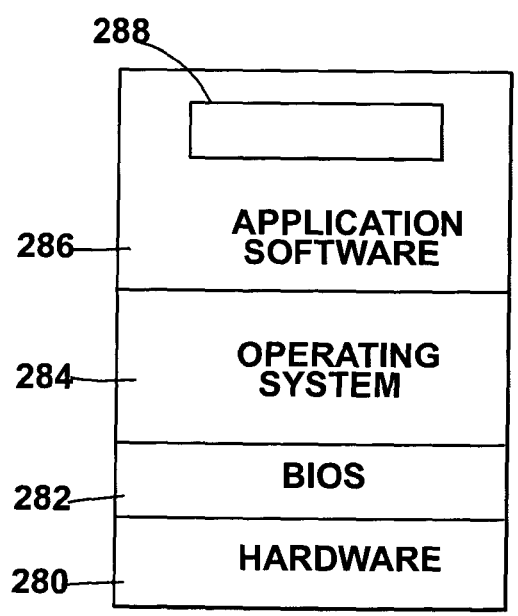
FIG. 5 is a schematic representation of an architectural stack employed by the navigation device of FIG. 3.

Turning to FIG. 5, the processor 202 and memory 214 cooperate to support a BIOS (Basic Input/Output System) 282 that functions as an interface between functional hardware components 280 of the navigation device 200 and the software executed by the device. The processor 202 then loads an operating system 284 from the memory 214, which provides an environment in which application software 286 (implementing some or all of the described route planning and navigation functionality) can run. The application software 286 provides an operational environment including the Graphical User Interface (GUI) that supports core functions of the navigation device, for example map viewing, route planning, navigation functions and any other functions associated therewith. In this respect, part of the application software 286 comprises a view generation module 288.

In the embodiment being described, the processor 202 of the navigation device is programmed to receive GPS data received by the antenna 224 and, from time to time, to store that GPS data, together with a time stamp of when the GPS data was received, within the memory 214 to build up a record of the location of the navigation device. Each data record so-stored may be thought of as a GPS fix; ie it is a fix of the location of the navigation device and comprises a latitude, a longitude, a time stamp and an accuracy report.

In one embodiment the data is stored substantially on a periodic basis which is for example every 5 seconds. The skilled person will appreciate that other periods would be possible and that there is a balance between data resolution and memory capacity; ie as the resolution of the data is increased by taking more samples, more memory is required to hold the data. However, in other embodiments, the resolution might be substantially every: 1 second, 10 seconds, 15 seconds, 20 seconds, 30 seconds, 45 seconds, 1 minute, 2.5 minutes (or indeed, any period in between these periods). Thus, within the memory of the device there is built up a record of the whereabouts of the device 200 at points in time.

In some embodiments, it may be found that the quality of the captured data reduces as the period increases and whilst the degree of degradation will at least in part be dependent upon the speed at which the navigation device 200 was moving a period of roughly 15 seconds may provide a suitable upper limit.

Whilst the navigation device 200 is generally arranged to build up a record of its whereabouts, some embodiments, do not record data for a predetermined period and/or distance at the start or end of a journey. Such an arrangement helps to protect the privacy of the user of the navigation device 200 since it is likely to protect the location of his/her home and other frequented destinations. For example, the navigation device 200 may be arranged not to store data for roughly the first 5 minutes of a journey and/or for roughly the first mile of a journey.

In other embodiments, the GPS may not be stored on a periodic basis but may be stored within the memory when a predetermined event occurs. For example, the processor 202 may be programmed to store the GPS data when the device passes a road junction, a change of road segment, or other such event.

Further, the processor 202 is arranged, from time to time, to upload the record of the whereabouts of the device 200 (ie the GPS data and the time stamp) to the server 150. In some embodiments in which the navigation device 200 has a permanent, or at least generally present, communication channel 152 connecting it to the server 150 the uploading of the data occurs on a periodic basis which may for example be once every 24 hours. The skilled person will appreciate that other periods are possible and may be substantially any of the following periods: 15 minutes, 30 minutes, hourly, every 2 hours, every 5 hours, every 12 hours, every 2 days, weekly, or any time in between these. Indeed, in such embodiments the processor 202 may be arranged to upload the record of the whereabouts on a substantially real time basis, although this may inevitably mean that data is in fact transmitted from time to time with a relatively short period between the transmissions and as such may be more correctly thought of as being pseudo real time. In such pseudo real time embodiments, the navigation device may be arranged to buffer the GPS fixes within the memory 214 and/or on a card inserted in the port 228 and to transmit these when a predetermined number have been stored. This predetermined number may be on the order of 20, 36, 100, 200 or any number in between. The skilled person will appreciate that the predetermined number is in part governed by the size of the memory 214/card within the port 228.

In other embodiments, which do not have a generally present communication channel 152 the processor 202 may be arranged to upload the record to the server 152 when a communication channel 152 is created. This may for example, be when the navigation device 200 is connected to a user's computer. Again, in such embodiments, the navigation device may be arranged to buffer the GPS fixes within the memory 214 or on a card inserted in the port 228. Should the memory 214 or card inserted in the port 228 become full of GPS fixes the navigation device may be arranged to deleted the oldest GPS fixes and as such it may be thought of as a First in First Out (FIFO) buffer.

In the embodiment being described, the record of the whereabouts comprises one or more traces with each trace representing the movement of that navigation device 200 within a 24 hour period. Each 24 is arranged to coincide with a calendar day but in other embodiments, this need not be the case.

Generally, a user of a navigation device 200 gives his/her consent for the record of the devices whereabouts to be uploaded to the server 150. If no consent is given then no record is uploaded to the server 150. The navigation device itself, and/or a computer to which the navigation device is connected may be arranged to ask the user for his/her consent to such use of the record of whereabouts.

The server 150 is arranged to receive the record of the whereabouts of the device and to store this within the mass data storage 160 for processing. Thus, as time passes the mass data storage 160 accumulates a plurality of records of the whereabouts of navigation devices 200 which have uploaded data.

As discussed above, the mass data storage 160 also contains map data. Such map data provides information about the location of road segments, points of interest and other such information that is generally found on map.

Figure 6:
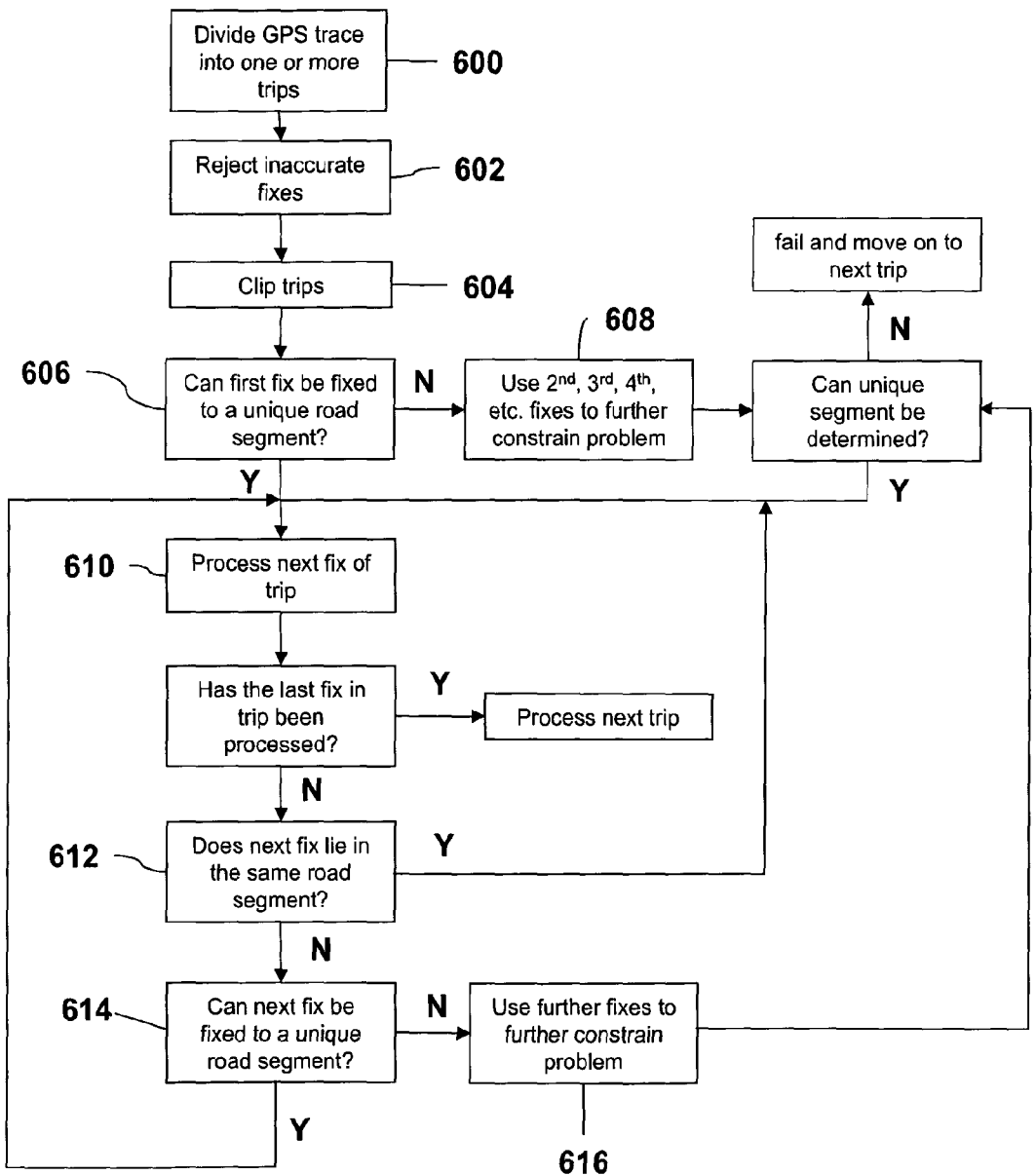
FIG. 6 shows a flowchart outlining an embodiment for matching GPS fixes within a trace to a map.

As a first process, the server 150 is arranged to perform a map matching function between the map data and the GPS fixes contained within the records of the whereabouts that have been received and such a process is described in relation to FIG. 6. Such map matching may be performed in a so-called real time manner; ie as the records of whereabouts are received or may be performed a time later after the records of the whereabouts have been recalled from the mass data storage 160.

In order to increase the accuracy of the map matching, pre-processing of the records of the whereabouts is performed as follows. Each GPS trace (ie a 24 hour period of GPS data) is divided 600 into one or more trips with each trip representing a single journey of the navigation device 200 which are subsequently stored for later processing.

Within each trip GPS fixes whose accuracy report received from the navigation device is not sufficiently high are rejected 602. Thus, in some embodiments, a fix may be rejected if the accuracy report indicates that the signals from less than three satellites 102 were being received by the navigation device 200 in relation to that GPS fix. Further, each trip is clipped 604 when the reported time between fixes goes above a threshold value. Each trip that passes this pre-processing stage is passed to be map matched.

In this context, a clipped trip is a trip in which the there is a predetermined time period between consecutive GPS fixes of greater than a predetermined time. As such, it might be inferred that the vehicle has remained stationary and as such it should be considered a first trip has ended and a second trip has commenced. Thus, a clipped trip becomes two separate trips.

However, before a trip is divided a check is made as to whether the position of the vehicle has changed between the last two fixes since a gap above the predetermined time between GPS fixes may also result from a loss of GPS signal and in such circumstances, the trip is not divided. In the embodiment being described, the predetermined time is roughly 3 minutes. However, the skilled person will appreciate that the gap may be any other suitable time, such as roughly any of the following: 15 seconds, 30 seconds, 1 minute, 90 seconds, 2 minutes, 5 minutes, 10 minutes or any time in between these. As discussed hereinafter, if the average speed of a navigation device 200 from which the GPS fixes are sent is below a predetermined threshold then data, may in some embodiments, be rejected in later processing. Such an embodiment can be useful in that it can remove data relating to so-called stop-start traffic which occurs after incidents such as a crash or the like which may leave remaining data more representative of steady state traffic flow.

Then, each trip is taken in turn and fixes within that trip are matched to a map from within the map data. Each map comprises a plurality of road segments along which it is possible to travel with each segment being represented within the map as a straight vector.

The program code running on the processor 154 of the server 150 provides a map matcher that is arranged to step over the or each fix in the trip that is being processed until it finds a fix which lies within a segment or is sufficiently close to a segment in order for it to be assumed to have occurred on that segment (ie it is within a distance threshold of the segment). This threshold allows for less than 100% GPS accuracy and the compressing effect of splitting the road into a set of straight vectors.

Each trip has an initial fix (ie the first fix within the trip) which is harder to associate with a segment than other fixes within the trip since there are no segments that have already identified which can be used to constrain the selection of the segments. If, for this first fix, multiple segments are within the threshold 606, then the algorithm looks to the next GPS fix (ie the 2nd fix) within the trip and generates a set of roots from those multiple segments based on the possible travel as a function of the distance between the 2 fixes (ie between the 1st and 2nd fixes). If the 2nd fix does not lead to a unique candidate segment for the 1st fix, then the algorithm moves to the 3rd fix within the trip and again generates and compares the possible routes to try and provide a unique candidate for the first fix 608. This process may continue until the remaining GPS fixes within a trip have been processed.

An advantage of such an embodiment is that although any one first fix in isolation may be near multiple segments, and in isolation these segments can not be distinguished between, it becomes possible using the further travel (ie the 2nd and 3rd fixes) to determine the identity of the segment with which the first fix is associated. Thus, a first segment for a trip is determined by the map matcher.

Once the first segment has been identified for a trip, further fixes are processed in order to identify further segments. It is of course possible that the next fix of the trip lies within the same segment as the first fix 612.

Thus, the subsequent fixes of a trip are processed 610 to determine if they are within the distance threshold of the segment, and the map matcher is arranged to associate that segment with each of the fixes that lie within the distance threshold. When the map matcher process a fix that is outwith the distance threshold it is arranged to generate a new set of candidate segments for that fix. However, it is now possible to add a further constraint that the next segment is one which is connected to the end of the one which has just been processed. These neighbouring segments are obtained by the map matcher from the underlying map data.

If at any point the map matcher fails to identify a segment for a given fix that follows on from the previous segment, either because there are no segments within a threshold, or it cannot uniquely identify a single segment, then the map matcher is arranged to step through subsequent fixes 616 in order to further constrain the journey until it can identify a segment that is a unique match. That is, if the nth fix cannot be uniquely associated with a segment the nth+1 segment is used to further constrain the identification of a segment. If the nth+1 fix does not produce a unique segment then the nth+2 fix is used. In some embodiments, this process may carry on until the a unique segment is identified or all of the GPS fixes with a trip have been processed.

The map matcher is arranged to try and uniquely identify segments; in the embodiment being described, it does not attempt to create a continuous route, only to try and match segments to fixes. In other embodiments, it may be desirable to try and have the map matcher generate continuous routes.

Therefore, at the end of the process that the map matcher is arranged to perform, a series of road segments are obtained along which the navigation device 200 has traveled in the trip being analysed. Subsequently, the map matcher further processes these road segments and assigns, from the GPS fixes, an ingress time and also a transit time for that segment. These assigned times are stored within the mass data storage 160 for later processing. It may well be that a plurality of GPS fixes are stored for each road segment. However, regardless of whether how many GPS fixes are associated with each segment, the ingress time, GPS fixes and the length of the segment (which in this embodiment is stored within the map data) are used to calculate the average speed for that segment of road. This average speed is then stored within the mass data storage 160 associated with the relevant assigned times and that segment. Information relating to a speed of traffic flow on a road segment and assigned to a road segment may be thought of as being speed data for that road segment.

Figure 7:
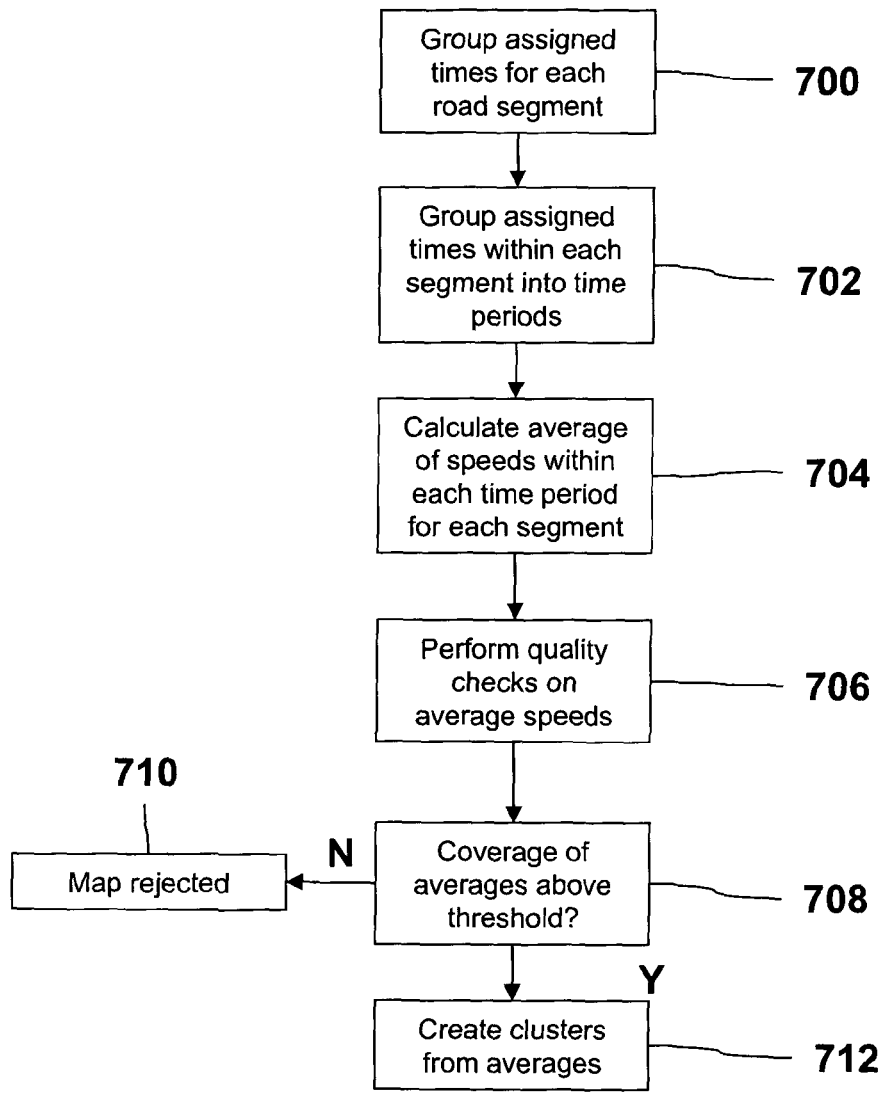
FIG. 7 shows a flowchart outlining an embodiment for generating an average.

The server 150 is further arranged to run averaging program code on the processor 154 to provide an averager which processes the assigned times to generate one or more averages therefrom as described below. The averaging process used in this embodiment is now described in relation to FIG. 7.

In a first step of the process 700, the averager groups the average speeds for each road segment on the map being processed. Within the grouping for each road segment, the averager is further arranged to group the average speeds within a set of predetermined time periods 702. Thus, average speeds which occur within the same time period (eg between 8.00 am and 8.59 am) are grouped together for further analysis. In the embodiment being described, the time periods are one hour durations but this need not be the case and the skilled person will appreciate, from the following description, that as the length of the time period decreases the resolution of the data is increased but storage requirements are increased. Other suitable time periods might substantially any of the following: 1 minute, 5 minute, 10 minute, 15 minute, 30 min, 2 hours, 6 hours, 12 hours, 24 hours, or any time in between these times.

In the embodiment being described, average speeds are stored in a time local to the area covered by the map being processed rather than a centralised time. Such a method is convenient as it provides a natural basis for traffic related issues.

Before an average speed generated from a trip is grouped into a predetermined time period it is screened to try and increase data quality. In this embodiment, the average speed is only added to the group for the predetermined period if the average speed falls within a predetermined range. In this embodiment, the method excludes speeds which exceed a maximum predetermined threshold (which may be roughly 180 km/h) and further, the method excludes speeds which fall below a predetermined amount of the average speed for that segment in that predetermined time period (which may for example be 2 km/h). The skilled person will appreciate that speeds which are well below the average speed for that segment in that time may well be associated with a problem in the traffic flow for that segment, such as a traffic jam or the like. Thus, including data relating to such conditions may reduce the overall accuracy of the data when considering the road in normal conditions. In other embodiments, the max permitted speed may be set as the speed limit for that segment of road, but the skilled person will appreciate that such information can be inaccurate in map data that is being processed and also that the speed limit for a segment of road may in fact not give an accurate indication of traffic conditions.

Once grouping into the predetermined time periods has been performed an average speed is calculated for each road segment for each predetermined time period. For example, all of the speeds within the 8.00 am to 8.59 am time period, for each segment of road are averaged. There are several options for computing the average speed: using plain arithmetic or harmonic means or computing the median. Indeed, in some embodiments, different weights may be used for the data sets according to the later intended use of the data.

Thus, in the embodiment being described and for the map being processed there is generated for each segment of road on the map 24 average speeds; an average speed for each hour long predetermined time period. It will be appreciated that if a different duration of time period is used then there will be a different number of average speeds. It will be further appreciated that, in fact, not all road segments will necessarily have an average speed assigned thereto for every time period since some roads may be traversed infrequently, particularly at unsociable times such as the early hours of the morning.

However, before further the average speeds per segment are used quality checks are performed 706. In this embodiment, this check ensures that more than a predetermined number of assigned times were used to generate average speed per segment. If this is not the case then that average speed per segment is rejected for further processing leaving a gap for that segment at one or more time periods. In some embodiments, the average is rejected if there are fewer than 5 values that went to make up that average. Other embodiments, may of course use different values, such as 2, 3, 4, 6, 7, 8, 10, 20 or more or any value in between these.

Also, a further check on the quality of the average is performed and for each average the standard deviation of the average is divided by the square root of the number of data samples that went to make up the average for that segment for that time period. If the result of this calculation is outside a predetermined threshold then that average is again rejected leaving a gap for that segment for that time period.

Further quality checks may be implemented to reject averages on any of the following: whether the deviation in the data is beyond a predetermined threshold; the existence of more than a predetermined number of outliers beyond a predetermined threshold. The skilled person will appreciate such statistical techniques to ensure the quality of the data.

The set of averages for any given road segment may be thought of as a measured speed profile for that road segment.

The skilled person will appreciate that if a measured speed profile for a road segment has few missing speed values (ie all or at least the majority of the predetermined time periods have a value) then that segment may be processed and the missing values are therefore masked. As the number of missing segments increases then the quality of the resulting cluster analysis is reduced. Thus, just how many missing time periods are allowed is a matter of a quality decision and has to be examined from case to case. Using only high-quality, complete data may imply too much weight to road segments with high coverage (ie few missing time periods) which normally comprises highways, motorways and other roads along which many people travel. Too low a requirement (ie clustering road segments that have too many missing time periods) leads to unrealistic clusters and inaccurate analysis.

Figure 8:
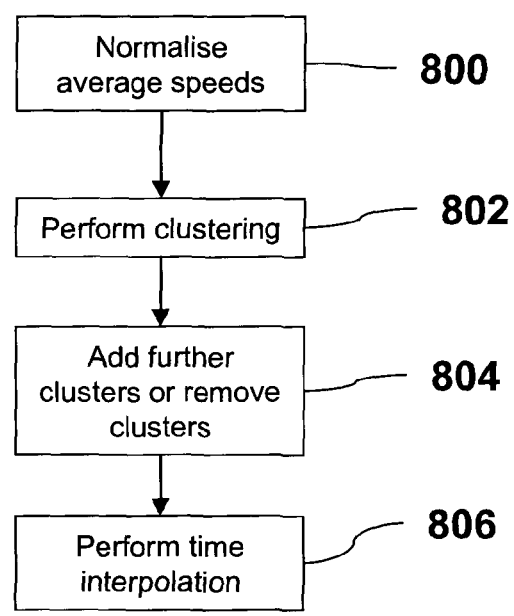
FIG. 8 shows a flowchart outlining an embodiment for performing cluster formation on averages.

Each average that passes these quality checks is considered trustworthy and is approved for use in further processing. In step 708 an assessment is made as to the overall coverage of average speeds per road segment. If the coverage of trustworthy averages is high enough then the map data is forwarded for further processing. However, if the coverage is below a predetermined threshold then the map is rejected from further consideration 710. Acceptable maps are passed for cluster formation as is described in relation to FIG. 8.

Such cluster formation aims to extract regular speed profiles in an automatic or semi-automatic manner; as will be discussed later, data compression, which may be significant, can be achieved if it is assumed that roads of a similar class may have a similar speed profile. For example, the speed at 10 am on a Sunday morning for a first segment of road may be similar to the speed at the same time for a second segment of road. If this similarity for those segments of road is repeated for other times then the speed profile for the first and second segments may be considered to be represented by the same speed profile of the second segment. The clustering as now defined aims to locate such similarities. Normalisation of speed profiles, as discussed below, may also allow a speed profile to be used for roads of a different class.

Before the clustering is performed, the measured speed profile is further processed in order to amalgamate the night-time time periods. In this embodiment, the average speeds between 9 pm and 5 am (ie 8 time periods) are averaged and this night-time average is used for each of 8 time periods. Thus, each speed profile has a flat speed profile between the hours of 9 pm and 8 am which may be termed the free flow speed of that road segment. It may be assumed that the free flow speed represents the speed at which a vehicle, generally a car, travels along the road and it is often the case that the free flow speed is different from the speed limit for that road segment. The free flow speed may also be roughly the same as the speed limit for that road segment.

In a first step 800 and in order to limit the number of clusters the measured speed profiles are normalised. Such normalisation can be performed according to a number of criteria. In the embodiment being described, normalisation occurs according to the free flow speed that has been calculated for the segment of road with which the average is associated. As such, the average speed per road segment that is passed to the clustering algorithm has a value of between 0 and 1. Such a method can aid further data compression since it can make the resulting cluster-generated speed profile independent of the type of road and as such it becomes possible to use the same set of speed profiles for road segments having any road type.

Use of the free-flow speeds during the night time period may reduce the dimension of the cluster formation since it may be possible to neglect night time speed values.

In yet further embodiments, the average speed or the speed limit of a road segment may be used as a further criteria against which to perform the normalisation.

Thus, days showing a similar traffic behavior can be grouped together by processing by a clustering algorithm. If the expected traffic behavior is different the cluster formation should run independently. An input parameter to the clustering algorithm is the number of desired clusters and a typical range is 10-70 for a day of the week. There are known methods to approach the optimal number of clusters (e.g. having some quality measures assigned and enlarging/reducing the numbers of clusters according to its trend) which may be used to determine whether the output of the clustering is acceptable.

In one embodiment, the clustering algorithm is run and arranged to generate around 60 clusters. In other embodiments, the algorithm may be arranged to generate more or less clusters initially. The resultant clusters are then processed to determine whether the generated clusters are satisfactory: are some of the clusters too similar (ie substantially the same)? Do any of the clusters have discontinuities therein? If there are problems with any of the clusters then the algorithm is re-run with the process aiming to generate fewer clusters than the first iteration. This iterative process is repeated until a satisfactory set of clusters is determined.

In some embodiments, whether the clusters are satisfactory includes a step of determining whether or not any of the cluster-generated profiles contain frequencies above a predetermined threshold. The presence of such frequencies indicates that that cluster-generated speed profile has a rate of change that is too high (ie there may be a discontinuity) and if used may result in instability, etc. within a navigation device 200 using that data to generate a route.

Whether or not the clusters are satisfactory may also include the step of performing a comparison between at least some, and generally each, of the cluster-generated speed profiles. In one particular embodiment this may be performed by a least squares comparison.

In one embodiment the cluster is performed by cluster analysis, but other class building methods might be used as well. A simple and efficient approach is the so-called k-means clustering algorithm. This non-hierarchical method normally starts with k random seeds and redistributes the class members according to a minimum error criteria based on a chosen metric. The algorithm leads to local minima only, therefore for an optimal solution it has to run multiple times. The run with the minimum error estimates gives what may be a preferred solution. The centroids of the final clusters form the predefined clusters. In other embodiments other clustering techniques may be used and these include hierarchical clustering and fuzzy clustering.

Some embodiments, may add further clusters 804. For example, some embodiments may add a flat line as a speed profile for road segments that have no trustworthy trend, e.g. due to low data coverage or because of traffic related issues.

As a final step 806 in the preparation of the cluster generated speed profiles, the clusters are interpolated to a variable time resolution. In one embodiment this is performed using cubic splines but other techniques are possible such as an exponential fitting function. The skilled person will also appreciate similar techniques that may be used.

Even if the time resolution used in the cluster analysis procedure itself is coarser than is finally desired, which may occur in order that there are a sufficient number of reliable average speed in any one predetermined time period, the time resolution can now be modified. For example, it can be modified to finer resolution to meet the requirements of the intended use. For example, it can be advantageous to have a finer resolution having a more continuous profile in place is desired to provide smoother routes which might otherwise "jump" on time boundaries if the time resolution is too coarse. In the embodiment being described, the cluster-generated profiles are interpolated in order that they have a resolution of roughly 5 min intervals, although any other period may be used. Such a period may be convenient for later processing using the cluster-generated speed profile.

Figure 9:
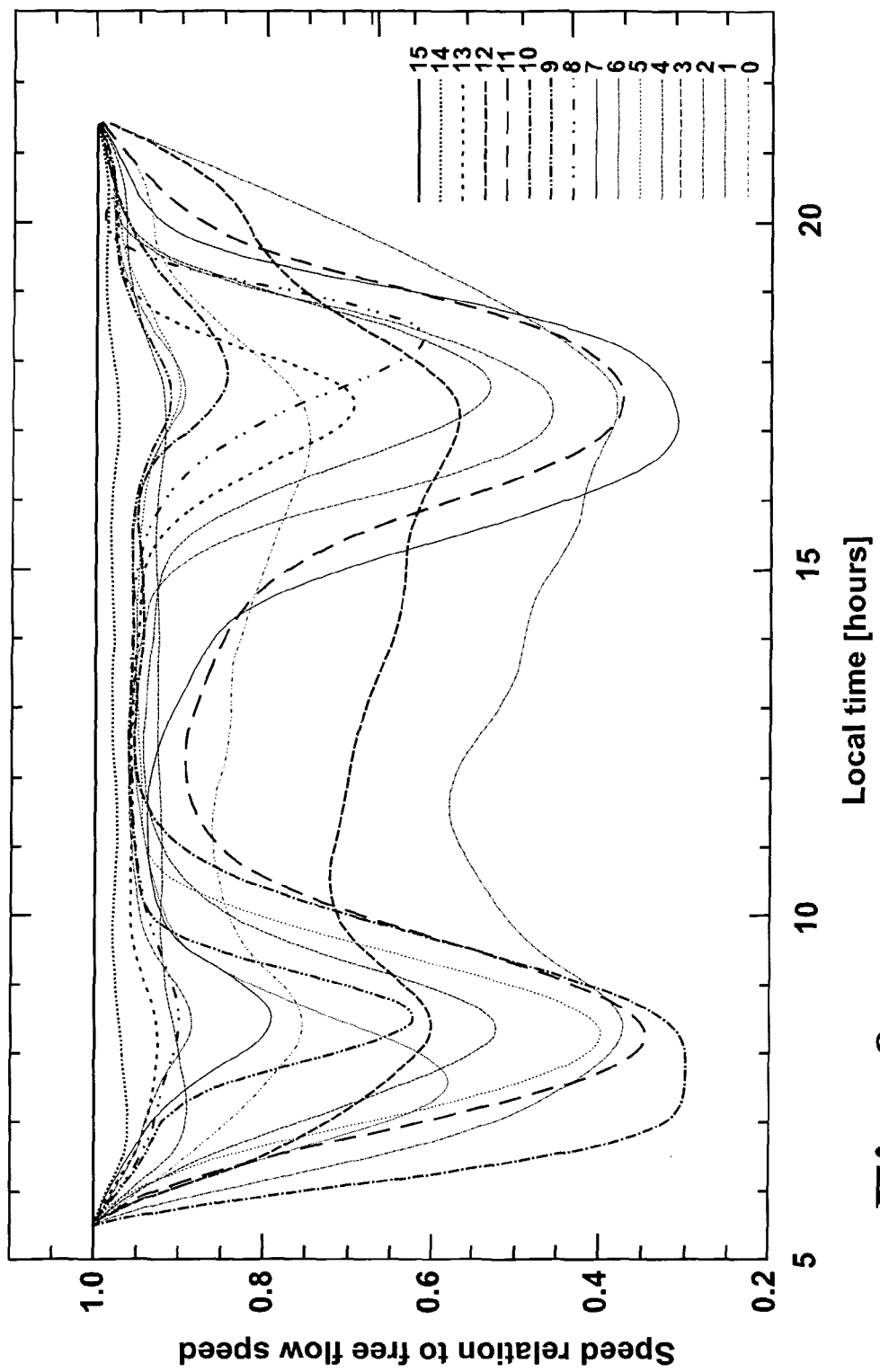
FIG. 9 shows an example set of cluster generated speed profiles which are an output for the clustering algorithm.
Figure 10:
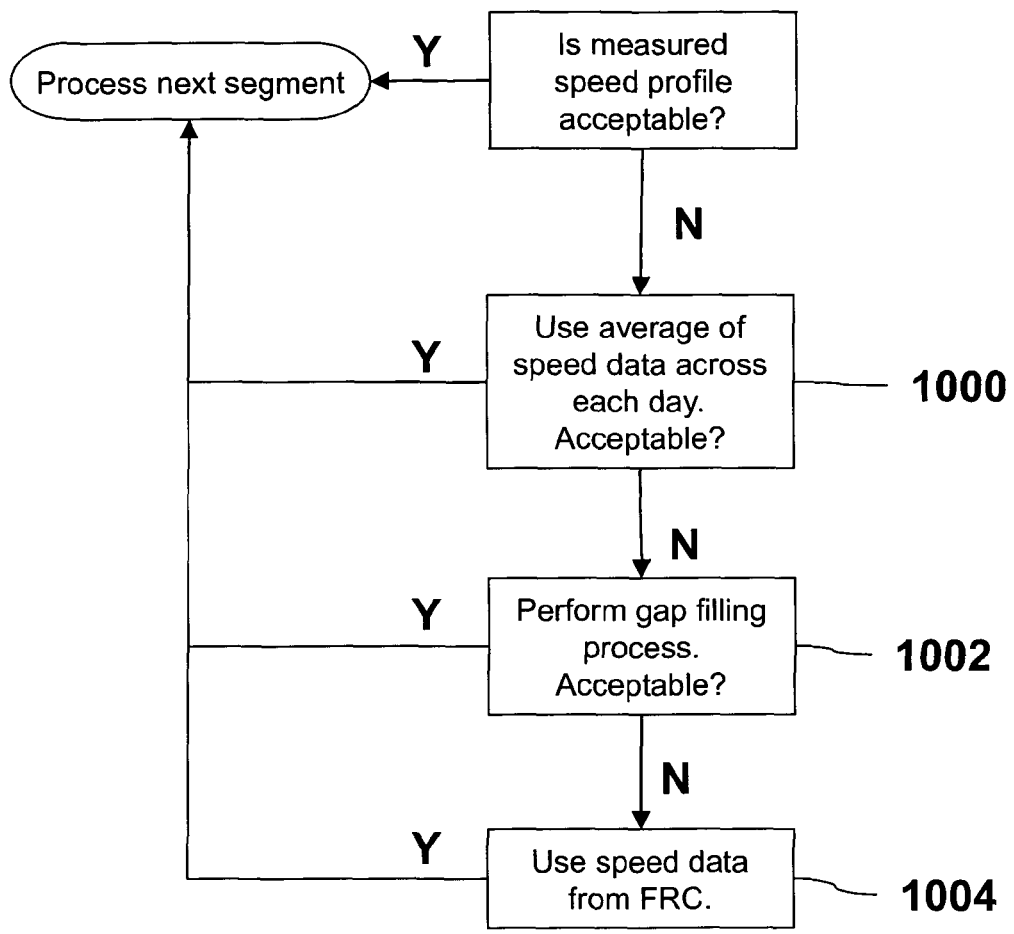
FIG. 10 shows a flow chart outlining a fall back strategy used to improve the quality of measured speed profiles associated with road segments.

FIG. 9 shows a typical output from the clustering algorithm for a map in which the input average speed values have been clustered into 16 independent cluster generated speed profiles. Thus, for that map each section of road can now be referred to as having one of the 16 cluster generated speed profiles. If in other embodiments, the number of clusters is varied then the number of possible speed profiles for any one segment of road is also changed.

Once, a suitable set of cluster generated speed profiles has been determined—in this embodiment 16 have been generated—then these are associated with one or more maps. Generally, a set of speed profiles will be more accurate for the map from which they have been generated since traffic behavior may be different on roads not on that map. For example, should a map cover a single country then it may be that traffic in a different country follows slightly different patterns.

However, in other embodiments, the speed profiles may be associated with a plurality of maps. In one example, this may be appropriate if the a map covers a portion of a country and/or it may be appropriate to use the map for a plurality of countries.

Figure 12:
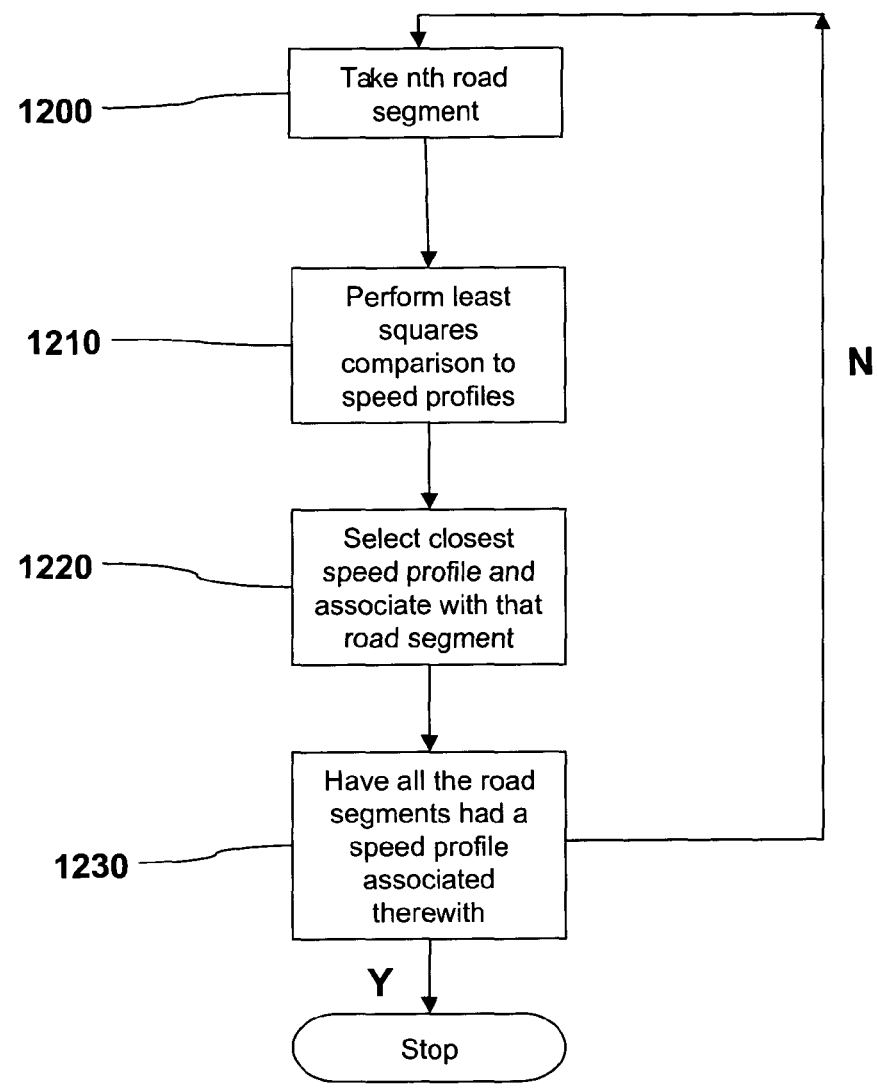
FIG. 12 shows a flowchart outlining how the cluster generated speed profiles are associated with road segments of at least one map.

Each road segment that is present on the map being processed is analysed and may have one of the cluster generated speed profiles (as shown in FIG. 9) associated therewith and this process is described in relation to FIG. 12. Starting with n=1, the nth road segment is processed 1200.

Reference is made herein to speed data being associated with a road segment. The skilled person will appreciate that each road segment is represented by data within the map data providing the map. In some embodiments, such data representing the road segment may include an identifier which provides a reference to the speed data. For example the reference may provide a reference to a generated speed profile.

It will be appreciated that in order that PND's using the map being processed can generate accurate routes, it is desirable that each road segment has a speed profile associated therewith in which there is a high degree of belief (as a first step this is assessed on whether the measured speed profile is suitable). Thus, if the quality assessment made earlier has determined that the measured speed profile does not meet the quality criteria then a fall back strategy is used to replace the measured speed profile with speed data which is likely to prove better for routing purposed when processed by a PND or other device.

Should it be determined that the measured speed profile is in fact unsuitable then as a first fall back position an average speed 1000 for the road segment being processed which comprises an average of all the speed data collected for that road segment is used instead of the measured speed profile. That is the data collected for each time period for each day is averaged to generate a single speed. This single average speed may be, in due course, mapped to the flat cluster generated speed profile (number 15 in FIG. 9).

Next, it should be determined whether the average speed generated from the data collected for a segment is acceptable. If the average passes these checks then the average is used for that road segment.

Again, a person skilled in the art of statistics will appreciate measures that may be used to measure the quality of the average. For example, in some embodiments, it may be required that the average is made up from more than a predetermined number of speeds, which may for example be roughly 10 speeds. Thresholds may be applied to the averages to ensure that they are above a minimum value (which may for example be roughly 2 km/h) and/or below a maximum value (which may for example be roughly 150 km/h). The standard deviation may also be used to determine whether the average is of a high enough quality.

It is known that road segments may be classified according to a classification system within map data such that roads of similar characteristics are classified within the same classification. For example, maps generated by one party has 8 categories into which road segments are classified. In some embodiments, the average for a given road segment is analysed to ensure that at least a predetermined percentage of roads within the classification for that road segment have provided a speed which has been used to generate the average. If this test fails then not only is the average rejected, but the gap filling procedure described next may also be omitted.

If road segment allow flow of traffic in two directions then there will be a set of average speeds associated with each direction.

It will be appreciated that should the measured speed profile have been replaced during the fall back strategy then there is effectively a speed profile which comprises a flat line, such as clustered speed profile number 15 as shown in FIG. 9. It will be further appreciated that because the speed profile information is normalised then speed profile number 15 may be used to represent any road segment having a single average speed associated therewith.

Figure 11:
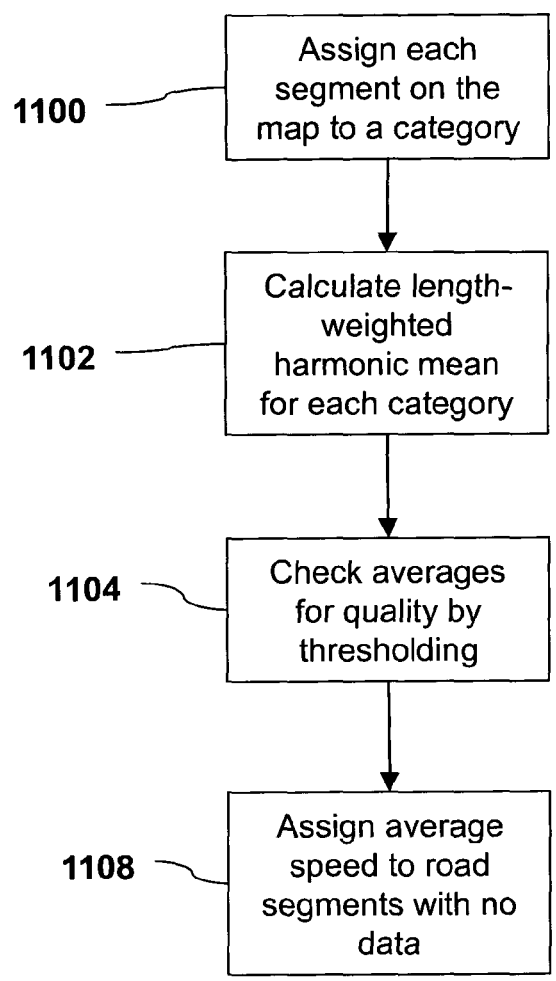
FIG. 11 shows a flowchart outlining an embodiment of how the quality of measured speed profile data is improved.

If the average generated from the collected data from that segment still fails the quality check then the next step 1002 of the fall back strategy is used and a so-called gap filling process is used which is now described with the aid of FIG. 11. As a first step each road segment on the map being processed is categorised as being a member of one of a predetermined number of categories 1100. The skilled person will appreciate that this categorisation of each road segment need only be performed once and the resulting categorisation maintained for further road segments for which the gap-filling process is invoked. Other embodiments could of course re-calculate at each invocation or indeed calculate the categories on the fly.

In the embodiment being described, there are 40 such categories as outlined in the following table 1. These categories may vary depending on the map data that is being processed, the area covered by the map, or any other relevant factor.

TABLE 1

| | Motorways |
|---|---|
| 0 | any motorway inside and outside city except roundabout, sliproad or parallel road |
| 1 | roundabout on motorway inside and outside city |
| 2 | sliproad on motorway inside and outside city |
| 3 | parallel road on motorway inside and outside city |
| | International Roads |
| 4 | any international road outside city except roundabout or sliproad |
| 5 | any international road inside city except roundabout or sliproad |
| 6 | roundabout on international road outside city |
| 7 | roundabout on international road inside city |
| 8 | sliproad on international road outside city |
| 9 | sliproad on international road inside city |
| | Major Roads |
| 10 | any major roads outside city except roundabout, sliproad or parallel road |
| 11 | any major roads inside city except roundabout, sliproad or parallel road |
| 12 | roundabout on major roads outside city |
| 13 | roundabout on major roads inside city |
| 14 | sliproad on major roads |
| 15 | sliproad on major roads inside city |
| 16 | parallel road on major roads inside and outside city |
| | Secondary Roads |
| 17 | any secondary roads outside city except roundabout, sliproad or parallel road |
| 18 | any secondary roads inside city except roundabout, sliproad or parallel road |
| 19 | roundabout on secondary roads outside city |
| 20 | roundabout on secondary roads inside city |
| 21 | sliproad on secondary roads outside city |
| 22 | sliproad on secondary roads inside city |
| 23 | parallel road on secondary roads inside and outside city |
| | Connecting Roads |
| 24 | any connecting roads outside city except roundabout or sliproad |
| 25 | any connecting roads inside city except roundabout or sliproad |
| 26 | roundabout on connecting roads outside city |
| 27 | roundabout on connecting roads inside city |
| 28 | sliproad on connecting roads outside city |
| 29 | sliproad on connecting roads inside city |
| | Important local Roads |
| 30 | any important local roads outside city except roundabout |
| 31 | any important local roads inside city except roundabout |
| 32 | roundabout on important local roads outside city |
| 33 | roundabout on important local inside city |
| | Local Roads |
| 34 | any local roads outside city except roundabout |
| 35 | any local roads inside city except roundabout |
| 36 | roundabout on local roads outside city |
| 37 | roundabout on local inside city |
| | Destination Roads |
| 38 | any destination roads outside city |
| 39 | any destination roads inside city |

Once each road segment is assigned to a category then a category average speed is calculated for each one of the predetermined categories 1102, in this case 40 categories. The category average that is generated is a single figure per category and in order to achieve this the average speed for each predetermined time period is averaged using any suitable averaging technique as mentioned herein. Again, the skilled person will appreciate that this step may only need to be performed once and the category average speed maintained for future invocations of the gap-filling process.

However, in this embodiment, each average speed for a class is calculated as a length-weighted harmonic mean of all of the elements belonging to the class, which is given by the following formula:

$$V_{mean} = L / \Sigma l_i / V_i$$

Whereas
  $V_{mean}$: mean speed of class j
  $l_i$: length of line i
  L: total length of all lines belonging to the class j ($L = \Sigma l_i$)
  $V_i$: average speed of line i Before these average speeds can be used further, they are checked to ascertain whether they are of a high enough quality such that they provide a reliable representation of the average speed for that category of road. This might not be the case should there be too few samples within that predetermined time period for that class of road or if there is too much variance in the samples that have gone to make up a particular average. Therefore, checks are made as to the quality of each average 1104 as now described.

If an average speed from one of the 40 categories is based on less segments than hit_number_min (which are shown, for this embodiment, in table 2 below) then this average is replaced by the value from another category as shown in table 3 below). In the embodiment being described the value for the minimum number of hit is ten but these may vary in other embodiments.

If neither quality_factor_abs of a particular category nor the quality_factor_rel of this category is smaller or equal to the values shown in table 2, then the average of the speed category is replaced with the average of the assigned replacement category as shown in table 2. It will be seen that quality_factor_rel_min is given by relative standard deviation of a class in % of the mean speed divided by square root of number of hits, quality_factor_abs*100/mean_speed.

Therefore there are three quality factors (quality_factor_abs_min, quality_factor_rel_min, hit_number_min) which are passed before an average speed in anyone category can be used. If the quality factors are not met then the averages speed is replaced according to table 3.

TABLE 2

| Parameter | Default value [range of value] | Descriptions |
|---|---|---|
| quality_factor_abs_min | 3 | Quality factor for data rejection: s/sqrt(n) (absolute speed standard deviation of a class in km/h divided by square root of number of hits) |
| quality_factor_rel_min | 5 | Quality factor for speed class replacement: s/sqrt(n) (relative standard deviation of a class in % of the mean speed divided by square root of number of hits, quality_factor_abs * 100/mean_speed) |
| hit_number_min | 10 | Minimum number of required total hits per speed class |

TABLE 3

| Speed category number | Replacement speed category number |
|---|---|
| 1 | 0 |
| 2 | 0 |
| 3 | 0 |
| 4 | 10 |
| 5 | 4 |
| 6 | 4 |
| 7 | 5 |
| 8 | 4 |
| 9 | 5 |
| 10 | 11 |
| 11 | 10 |
| 12 | 10 |
| 13 | 11 |
| 14 | 10 |
| 15 | 11 |
| 16 | 10 |
| 17 | 18 |
| 18 | 17 |
| 19 | 17 |
| 20 | 18 |
| 21 | 17 |
| 22 | 18 |
| 23 | 17 |
| 24 | 25 |
| 25 | 24 |
| 26 | 24 |
| 27 | 25 |
| 28 | 24 |
| 29 | 25 |
| 30 | 31 |
| 31 | 30 |
| 32 | 30 |
| 33 | 31 |
| 34 | 35 |
| 35 | 34 |
| 36 | 34 |
| 37 | 35 |
| 38 | 39 |
| 39 | 38 |

The values shown in table 2 may well vary in other embodiments and are shown as an example only. Likewise, the replacement values used in table 3 may well vary in other embodiments, depending upon the area covered by the map, the party that generated the map data, etc.

Before one of the averages generated for a category can be used it is checked to see whether it passes some quality checks. If it does not pass these checks then the gap filling procedure fails for that category. These quality checks are as follows.

The average for the classification should lie above a minimum threshold and below a maximum threshold which are computed in the following way, with min and max are pseudo code minimum and maximum functions:

Min_speed_threshold=max[max(mean−
   lower_relative_devision*mean/100,mean−
   lower_absolute_devision),lower_limit]

Max_speed_threshold=min[min(mean+
   upper_relative_devision*mean/100,mean+
   upper_absolute_devision),upper_limit]

whereas mean is the mean speed of the appropriate speed class of the segment. The other quantities are defined in Table 4.

If a speed associated with a segment fail these criteria then that speed is replaced by its threshold based on its mean speed unless the speed associated with the segment does not offend the absolute speed limits in which case the absolute speed limits will be used as the speed for that segment.

TABLE 4

| Parameter | Default value [range of value] | Descriptions |
|---|---|---|
| upper_limit | 130 | Absolute allowed maximum speed for a segment in km/h |
| lower_limit | 5 | Absolute allowed minimum speed in km/h for a segment |
| upper_relative_devision | 50 | Maximum allowed upper speed deviation for a segment in percent of its class mean |
| upper_absolute_devision | 30 | Maximum allowed upper absolute speed deviation in km/h for a segment related to its class mean |
| lower_relative_devision | 50 | Maximum allowed lower speed deviation for a segment in percent of its class mean |
| lower_absolute_devision | 30 | Maximum allowed lower absolute speed deviation in km/h for a segment related to its class mean |

The skilled person will appreciate that the calculations are performed on speeds and not upon time data.

Thus, at the end of the gap filling process an average speed may have been generated, based upon road segments within the same category from the predetermined 40. However, the gap-filling process might still fail (ie no average is generated which passes the quality checks).

Thus, road segments which have no speed data associated with them now have an average speed data assigned thereto 1108 which has been generated by the gap filling procedure (assuming that average has passed the quality checks).

Should the gap filling fails then, in step 1004, the speed associated with that road segment is set to be the speed that has been provided by the map data supplier according to Functional Road Class (FRC). The functional road class may for example comprise roughly 8 categories, although this might differ between map data suppliers. That is, the free flow speed is set to a value according to the FRC and the cluster generated speed profile is set to be, in this embodiment, profile number 15.

Next, the speed profile (whether a measured speed profile or an average inserted by gap filling) associated with a road segment is now mapped to one of the cluster generated speed profiles to generate the map data which can be used by navigation devices such as PND's. This may be performed regardless of whether the speed information is a measured speed profile or an average in view of the presence of the flat cluster generated speed profile number 15.

In step 1210 the speed profile is compared, using a least squares comparison, with each of the speed profiles in the set of cluster generated speed profiles. After these 16 comparisons have been made it is possible to determine which speed profile from the set of 16 is closest to the speed profile associated with the road segment and in step 1220 a reference to the cluster generated speed profile that is deemed to be closest is stored in the map data for that road segment. Also stored in the map data in relation to that road segment is the free flow speed for that road segment which has been calculated earlier.

Thus, using the reference and the free flow speed, information can be stored within the map data which provides information on the average speeds for each road segment. For frequently traveled segments the average speed information provided may be thought of as comprising an approximation to the daily hourly average between the hours of 9 am to 5 pm.

For less traveled segments the average speed information may be thought of as being an average speed which is averaged across all time periods.

This is repeated 1230 until each of the road segments on the map has had one of the set of 16 cluster generated speed profiles associated therewith.

Before the map data may be released for use a final check is made to see if a sufficient number of road segments have a measured speed profile associated with them (as opposed to an average that has been inserted instead of a measured speed profile). If this check is not passed then the whole map is rejected and not released for use.

In this final check, the total length of road segments is calculated for each Functional Road Class (FRC). The FRC's are related to the 40 categories listed in table 2 as shown in table 5 below. The length of road segment within each FRC with average speed data assigned thereto should be above the threshold percentage of the total road length within the FRC as shown in table 5.

TABLE 5

| FRC (Functional Road Class) Description | FRC | Minimum required length coverage [%] |
|---|---|---|
| Motorways | 0 | 60 |
| International roads | 1 | 50 |
| Major roads | 2 | 40 |
| Secondary roads | 3 | 30 |
| Connecting roads | 4 | 18 |
| Important local roads | 5 | 12 |
| Local roads | 6 | 2 |
| Destination roads | 7 | 0 |

It will be seen that the minimum coverage figures for road categories which in general have more impact on routing behavior are given a higher percentage requirement when compared to road categories which have a lower impact. For example, FRC 0 (Motorways) are required to have 60% because they have a higher impact on routing when compared to, for example, secondary roads which consequently have a requirement for 30% coverage.

In other embodiments further fall back strategies may be provided. In one such embodiment, a first fall back strategy (should the measured speed profile been deemed unacceptable) may be to aggregate the same predetermined time periods for each day are added to that period for each of the other days and then the resulting aggregated speed profile is used for each day rather than using a measured speed profile for each separate day. Therefore, in such an embodiment, a weekly speed profile is generated by adding the same time periods for each of the days Monday to Friday and a weekend speed profile is generated by adding the same time periods for each of Saturday and Sunday. It will be appreciated that traffic flow on the weekend may well be different to traffic flow on week days.

Such aggregated speed profile may then be checked to see if passes quality criteria before using other fall back strategies if it is not acceptable. These checks may be made using the same, or at least similar, criteria to those used to assess the measured speed profiles. If the aggregation of the data has improved the quality so that both the weekly and weekend speed profiles pass the quality check then these speed profiles are used for that road segment.

The skilled person will appreciated that an apparatus provided to execute a method as described herein may comprise hardware, software, firmware or any combination of two or more of these.

The skilled person will appreciate that, whilst the term GPS data has been used to refer to position data derived from a GPS global positioning system as for example described in relation to FIG. 1, other position data could be processed in a manner similar to the methods as described herein. Thus, term GPS data may be replaceable with the phrase positioning data. Such position information, could for example be derived from position information derived from mobile phone operation, data received at toll barriers, data obtained from induction loops embedded in roads, data obtained from number plate recognition system or any other suitable data.

The invention claimed is:

1. A method of processing positioning data to generate map data within a map, the map comprising a plurality of navigable segments representing segments of a navigable route in an area covered by the map associated with each segment, the method comprising:
   generating a measured speed profile for each navigable segment from received trace data, the measured speed profile being representative of a set of average speeds for each of a plurality of time periods for the navigable segment;
   classifying each navigable segment into one of a plurality of predetermined categories according to a parameter of the navigable segment;
   generating a category average speed for each category within the classification;
   for each of one or more of the navigable segments,
      performing a quality assessment of the measured speed profile for the navigable segment to determine if the measured speed profile is of a predetermined quality;
      when the measured speed profile is of the predetermined quality, using the measured speed profile as the speed data for the navigable segment;
      when the measured speed profile is not of the predetermined quality, determining if an average of speed data for the navigable segment meets a first threshold;
      when the average of the speed data meets the first threshold, generating a replacement speed profile for the navigable segment based on the average of the speed data and using the replacement speed profile as the speed data for the navigable segment;
      when the average of the speed data does not meet the first threshold, using the corresponding category average speed as the speed data for the navigable segment, wherein using the category average speed comprises determining that the category average speed meets a second threshold; and
   processing the speed data associated with each navigable segment to generate said map data.

2. A method according to claim 1, wherein the method further comprises an initially receiving captured Global Positioning System (GPS) data by way of uploading GPS data from at least one Portable Navigation Devices (PND) and processing the GPS data to generate the speed data associated with one or more navigable segments.

3. A method according to claim 2 wherein each time period is one of a day or an hour.

4. A method according to claim 1, further comprising:
   performing cluster analysis on the measured speed profiles in order to generate a set of cluster generated speed profiles.

5. A method according to claim 4, further comprising:
   mapping the speed data associated with at least some navigable segment to a cluster generated speed profile.

6. A method according to claim 4, wherein the speed data associated with at least some navigable segment is replaced with a reference to the cluster generated segment.

7. A method according to claim 4, wherein the cluster generated speed profiles are normalised according to a parameter.

8. A method according to claim 7, further comprising:
   storing, for the navigable segment, the parameter used to normalise the cluster generated speed profile in the map data.

9. The method of claim 7, wherein the normalised cluster generated speed profiles are used for two or more different road classes.

10. The method of claim 4, wherein one of the set of cluster generated speed profiles is flat, and said category average speed associated with a navigable segment is mapped to the flat cluster generated speed profile.

11. The method of claim 1, wherein the quality assessment is determined using an absolute number of readings associated with the speed data or a standard deviation of the speed data.

12. A machine comprising:
   a processor arranged to process map data comprising a plurality of navigable segments representing segments of a navigable route in the area covered by a map, the processor being arranged to:
   generate a measured speed profile for each navigable segment from received trace data, the measured speed profile being representative of a set of average speeds for each of a plurality of time periods for the navigable segment;
   classify each navigable segment into one of a plurality of predetermined categories according to a parameter of the navigable segment;
   generate a category average speed for each category within the classification;
   for each of one or more of the navigable segments,
      perform a quality assessment of the measured speed profile for the navigable segment to determine if the measured speed profile is of a predetermined quality;
      when the measured speed profile is of the predetermined quality, use the measured speed profile as the speed data for the navigable segment;
      when the measured speed profile is not of the predetermined quality, determine if an average of speed data for the navigable segment meets a first threshold;
      when the average of the speed data meets the first threshold, generate a replacement speed profile for the navigable segment based on the average of the speed data and use the replacement speed profile as the speed data for the navigable segment; and
      when the average of the speed data does not meet the first threshold, use the corresponding category average speed as the speed data for the navigable segment, wherein using the category average speed comprises determining that the category average speed meets a second threshold; and
   process the determined speed data associated with each navigable segment to generate said map data.

13. The machine of claim 12, further comprising:
   a memory for storing a plurality of navigable segments representing segments of a navigable route in the area covered by the map data and speed data being associated with each navigable segment.

14. A non-transitory computer-readable medium containing instructions which, when executed performs the method of processing positioning data to generate map data within a map, the map comprising a plurality of navigable segments representing segments of a navigable route in an area covered by the map associated with each segment the method executed by the contained instructions comprising:

- generating a measured speed profile for each navigable segment from received trace data, the measured speed profile being representative of a set of average speeds for each of a plurality of time periods for the navigable segment;
- classifying each navigable segment into one of a plurality of predetermined categories according to a parameter of the navigable segment;
- generating a category average speed for each category within the classification;
- for each of one or more of the navigable segments,
  - performing a quality assessment of the measured speed profile for the navigable segment to determine if the measured speed profile is of a predetermined quality;
  - when the measured speed profile is of the predetermined quality, using the measured speed profile as the speed data for the navigable segment;
  - when the measured speed profile is not of the predetermined quality, determining if an average of speed data for the navigable segment meets a first threshold;
  - when the average of the speed data meets the first threshold, generating a replacement speed profile for the navigable segment based on the average of the speed data and using the replacement speed profile as the speed data for the navigable segment;
  - when the average of the speed data does not meet the first threshold, using the corresponding category average speed as the speed data for the navigable segment, wherein using the category average speed comprises determining that the category average speed meets a second threshold; and
- processing the speed data associated with each navigable segment to generate said map data.

* * * * *